US011209091B2

(12) United States Patent
Wu

(10) Patent No.: US 11,209,091 B2
(45) Date of Patent: Dec. 28, 2021

(54) INFLATOR VALVE CONNECTOR

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 0 days.

(21) Appl. No.: 17/087,809

(22) Filed: Nov. 3, 2020

(65) Prior Publication Data
US 2021/0254733 A1 Aug. 19, 2021

(30) Foreign Application Priority Data

Feb. 14, 2020 (TW) .................................. 109104807

(51) Int. Cl.
*F16K 15/20* (2006.01)
*F16K 11/07* (2006.01)

(52) U.S. Cl.
CPC ............ *F16K 15/207* (2013.01); *F16K 11/07* (2013.01); *F16K 15/205* (2013.01); *Y10T 137/3584* (2015.04); *Y10T 137/374* (2015.04); *Y10T 137/3724* (2015.04)

(58) Field of Classification Search
CPC ......... Y10T 137/3584; Y10T 137/3724; Y10T 137/374; F16K 11/07; F16K 15/205; F16K 15/207; F04B 33/005
See application file for complete search history.

(56) References Cited

U.S. PATENT DOCUMENTS

| 5,921,269 A * | 7/1999 | Wu ........................... B60S 5/04 137/223 |
| 6,102,063 A | 8/2000 | Pierce et al. |
| 8,360,090 B2 * | 1/2013 | Wang ..................... F16K 11/056 137/223 |
| 8,402,987 B2 * | 3/2013 | Wang ....................... B60S 5/043 137/223 |
| 8,839,809 B1 * | 9/2014 | Wang ..................... F04B 33/005 137/223 |
| 2013/0186490 A1 * | 7/2013 | Wu ........................ F04B 33/005 137/613 |
| 2013/0186979 A1 * | 7/2013 | Wu ........................ F04B 33/005 239/268 |

FOREIGN PATENT DOCUMENTS

| CN | 106014937 A | 10/2016 |
| TW | M375132 U | 3/2010 |
| TW | 201016968 A | 5/2010 |
| TW | 201319433 A | 5/2013 |
| TW | 201319434 A | 5/2013 |
| TW | M583490 U | 9/2019 |

* cited by examiner

*Primary Examiner* — Kevin F Murphy
(74) *Attorney, Agent, or Firm* — Karin L. Williams; Alan D. Kamrath; Mayer & Williams PC

(57) ABSTRACT

An inflator valve connector includes a housing, a connection assembly, a valve seat, and a pushing member. The connection assembly is rotatably arranged in the housing and includes a first connection hole adapted to connect a Presta valve and a second connection hole adapted to connect a Schrader valve. The valve seat has a first abutting portion faced to the first connection hole and adapted to abut a lock nut of the Presta valve, and a second abutting portion faced to the second connection hole and adapted to abut a valve core of the Schrader valve. The pushing member removably contacts the connection assembly and has a pushing portion adapted to enter the housing via the first connection hole and to push against the first abutting portion, causing the valve seat to move relative to the housing and to close to the second connection hole.

10 Claims, 5 Drawing Sheets

INFLATOR VALVE CONNECTOR

BACKGROUND OF THE INVENTION

The present invention relates to an inflator valve connector for inflation apparatus and more particularly, to a dual use valve connector fora Schrader valve and a Presta valve.

Conventional dual valve connectors commonly have a Schrader valve connection hole and a Presta valve connection hole arranged in parallel at one side and a lever located on the other side. When the valve of the inflatable object to be inflated is connected to the Schrader valve connection hole or the French valve connection hole, the lever is pulled to squeeze a rubber sleeve in the dual valve connector, thereby elastically deforming the rubber sleeve to hold the valve of the inflatable object. These dual valve connectors must provide a manual or automatic air passage switching mechanism to match the valve inflation operation. These conventional dual valve connectors commonly have a complicated structure and large size and therefore require a large operation space. Further, the valve of the inflatable object may be disconnected from the rubber sleeve accidentally during the inflation operation.

Thus, a need exists for a novel inflator valve connector that mitigates and/or obviates the above drawbacks.

BRIEF SUMMARY OF THE INVENTION

An objective of the present invention is to provide an inflator valve connector for a Schrader valve and a Presta valve.

An inflator valve connector according to the present invention includes a housing, a connection assembly, a valve seat, and a pushing member. The housing has a head, an axial hole arranged in the head, a body extended outwardly from the head, and a through hole arranged in the body and intercommunicated with the axial hole. The connection assembly is rotatably arranged in the axial hole and includes a first connection hole adapted to connect a Presta valve, a second connection hole adapted to connect a Schrader valve, and a receiving hole intercommunicated with the first and second connection holes. The valve seat is movably arranged in the receiving hole and has a first abutting portion disposed at a first end thereof and a second abutting portion disposed at a second end thereof opposite to the first end. The first abutting portion is faced to the first connection hole and is adapted to abut a lock nut of the Presta valve. The second abutting portion faces the second connection hole and is adapted to abut a valve core of the Schrader valve. The pushing member removably contacts the connection assembly and has a pushing portion adapted to enter the receiving hole via the first connection hole and to push against the first abutting portion, causing the valve seat to move relative to the receiving hole and to close to the second connection hole.

In an example, the first abutting portion forms an abutting recess adapted to abut the pushing portion and the lock nut of the Presta valve.

In an example, the pushing member has a connection portion connected with the body. The pushing member is made of a flexible material, so that the pushing portion is able to sway relative to the connection portion.

In an example, the connection portion is ring-shaped and is sleeved on the body.

In an example, the pushing member has a cover portion disposed between the pushing portion and the connection portion. The pushing portion is formed on an end face of the cover portion. The cover portion covers the connection hole when the pushing portion enters the receiving hole via the first connection hole.

In an example, the connection assembly includes a first connection member and a second connection member connected to the first connection member. The first connection hole and the receiving hole are arranged in the first connection member, and the second connection hole is arranged in the second connection member.

In an example, the connection assembly includes an air passage formed between an inner periphery of the axial hole and an outer periphery of the first connection member. The first connection member has an air vent penetrating therethrough and intercommunicates with the air passage and the through hole. An airtight ring is mounted around an outer periphery of the valve seat and is abutted against an inner periphery of the receiving hole. The airtight ring is located between the air vent and the second connection hole when the pushing portion pushes against the first abutting portion and the valve seat closes to the second connection hole. The airtight ring passes over the air vent and is located between the air vent and the first connection hole when the second connection hole connects the Schrader valve and the second abutting portion is pushed by the valve core of the Schrader valve to cause the valve seat moving relative to the receiving hole and closing to the first connecting hole.

In an example, the first connection member has a first shoulder formed between the first connection hole and the receiving hole. The second connection member has a second shoulder formed between the second connection hole and the receiving hole. An airtight sleeve is mounted around the second abutting portion and abuts the inner periphery of the receiving hole. The first abutting portion and the airtight sleeve respectively selectively abut the first shoulder and the second shoulder as the valve seat moves relative to the receiving hole.

In an example, the first connection member has two annular grooves respectively formed at two opposite sides of the air vent. The connection assembly includes two seal rings respectively arranged in the two annular grooves and abutted against the inner periphery of the axial hole.

In an example, the first connection member has a large diameter section and a small diameter section connected to the large diameter section. The large diameter section is exposed to the axial hole. The small diameter section passes through the axial hole and is connected to the second connection member. The first connection hole is formed in the large diameter section. The receiving hole is formed in the small diameter section. The air passage is formed between the inner periphery of the axial hole and an outer periphery of the small diameter section.

The present invention will become clearer in light of the following detailed description of illustrative embodiments of this invention described in connection with the drawings.

DETAILED DESCRIPTION OF THE INVENTION

Figure 1:
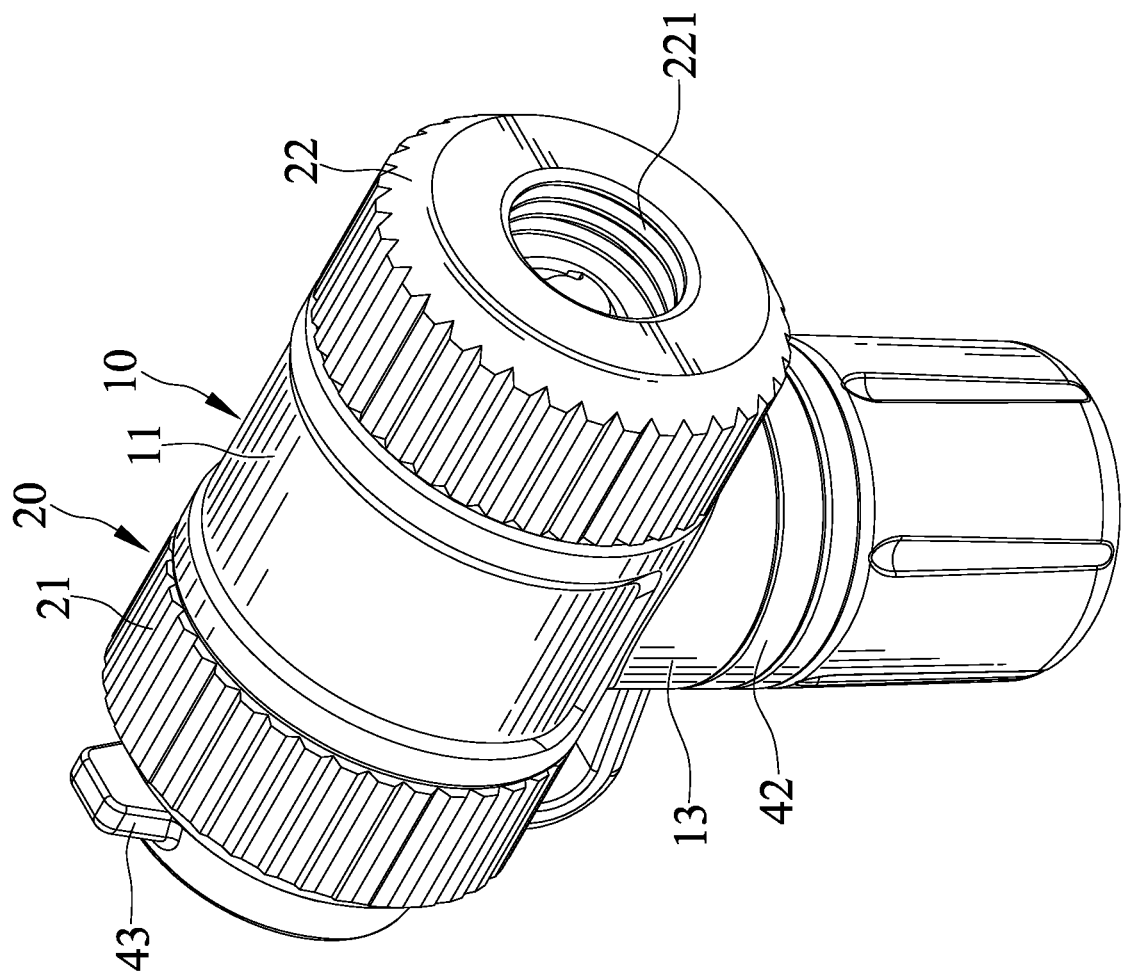
FIG. 1 is a perspective view of inflator valve connector of an embodiment according to the present invention.
Figure 2:
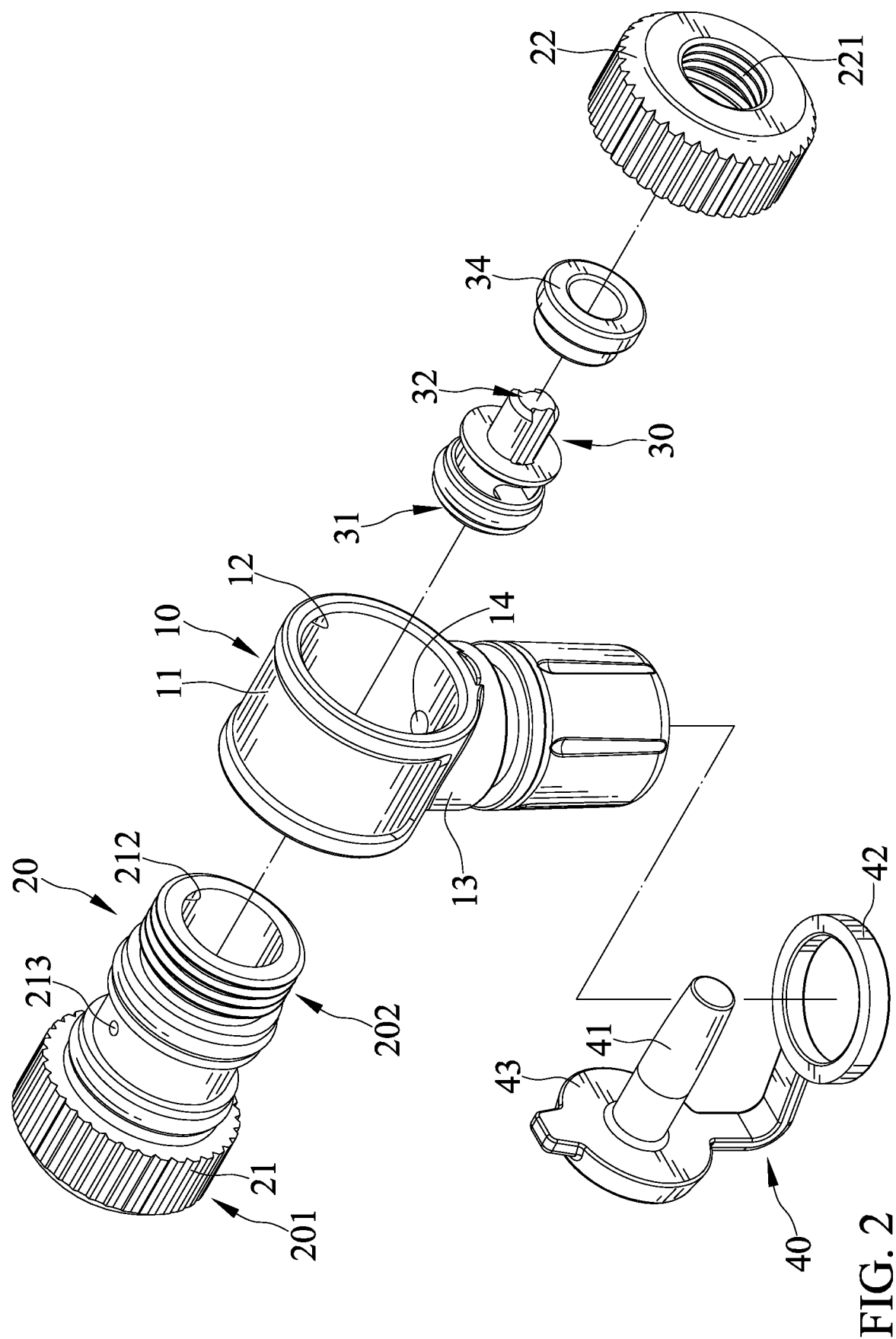
FIG. 2 is an exploded, perspective view of the inflator valve connector of FIG. 1.

With reference to FIGS. 1-5, an inflator valve connector of an embodiment according to the present invention includes a housing 10, a connection assembly 20, a valve seat 30, and a pushing member 40.

The housing 10 has a head 11, an axial hole 12 arranged in the head 11, a body 13 extended outwardly from the head 11, and a through hole 14 arranged in the body 13 and intercommunicated with the axial hole 12. The body 13 can be connected to an air pipe of an inflator, and the air pipe intercommunicates with the through hole 14, so that the high-pressure air provided by the inflator can enter the axial hole 12.

The connection assembly 20 is rotatably arranged in the axial hole 12 and includes a first connection hole 211 adapted to connect a Presta valve PV, a second connection hole 221 adapted to connect a Schrader valve SV, and a receiving hole 212 intercommunicates with the first and second connection holes 211 and 221. In the embodiment, the first and second connection holes 211 and 221 may be disposed at two opposite of the connection assembly 20 and be formed as screw holes. The connection assembly 20 includes a first connection member 21 and a second connection member 22 connected to the first connection member 21. The first connection hole 211 and the receiving hole 212 are arranged in the first connection member 21. The first connection member 21 has a large diameter section 201 and a small diameter section 202 connected to the large diameter section 201. The large diameter section 201 is exposed to the axial hole 12. The small diameter section 202 passes through the axial hole 12 and is threadedly connected to the second connection member 22. The first connection hole 211 is formed in the large diameter section 201. The receiving hole 212 is formed in the small diameter section 202. The second connection hole 221 is arranged in the second connection member 22.

The connection assembly 20 includes an air passage 23 formed between an inner periphery of the axial hole 12 and an outer periphery of the small diameter section 202 of the first connection member 21. The first connection member 21 has an air vent 213 penetrating therethrough and intercommunicates with the air passage 23 and the through hole 14, a first shoulder 214 formed between the first connection hole 211 and the receiving hole 212, and two annular grooves 215 respectively formed at two opposite sides of the air vent 213. The second connection member 22 has a second shoulder 222 formed between the second connection hole 221 and the receiving hole 212. The connection assembly 20 further includes two seal rings 24 respectively arranged in the two annular grooves 215 and abutted against the inner periphery of the axial hole 12.

Figure 4:
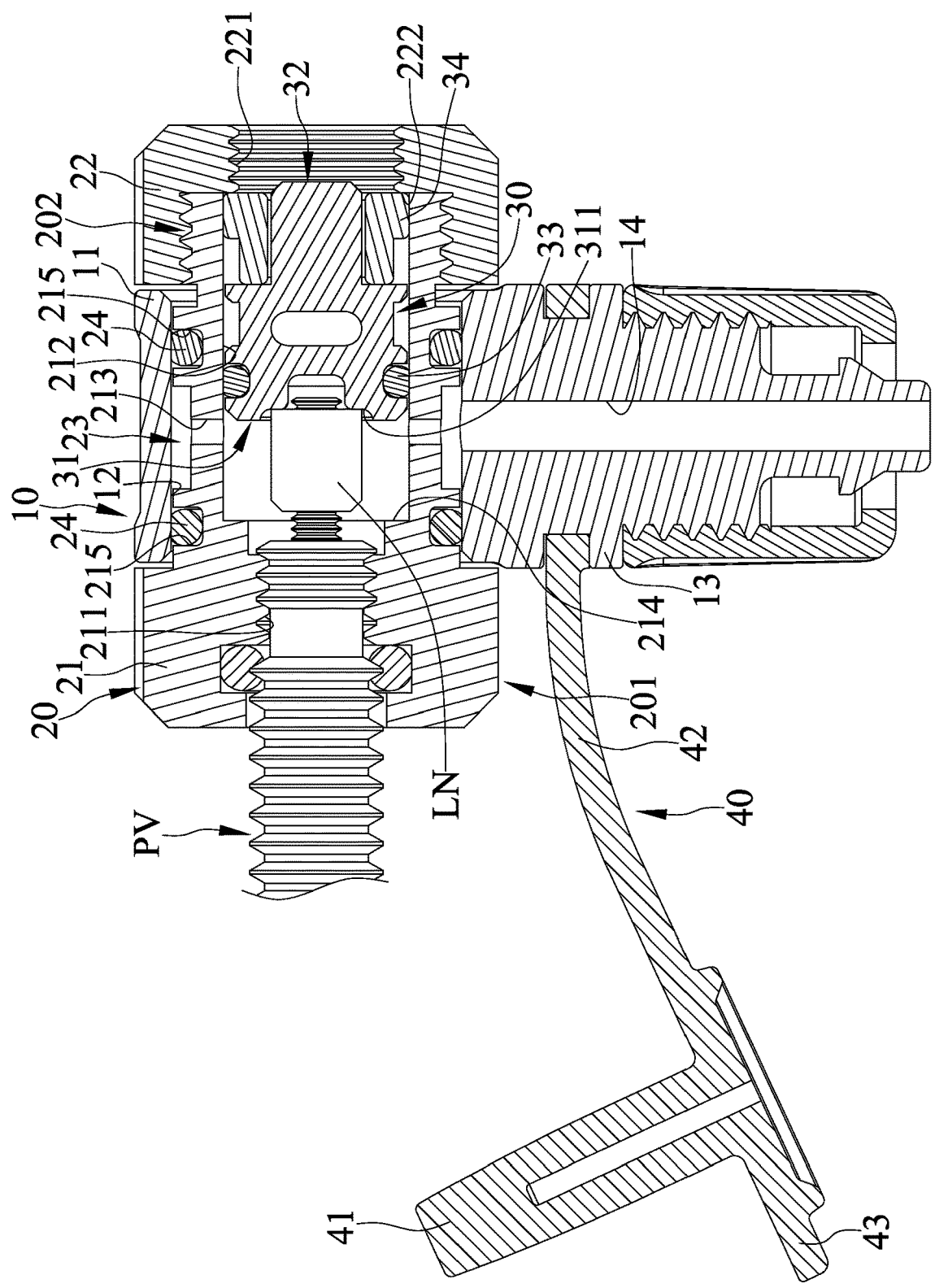
FIG. 4 is a cross sectional view of the inflator valve connector of FIG. 1 and shows the inflator valve connector connecting a Presta valve.
Figure 5:
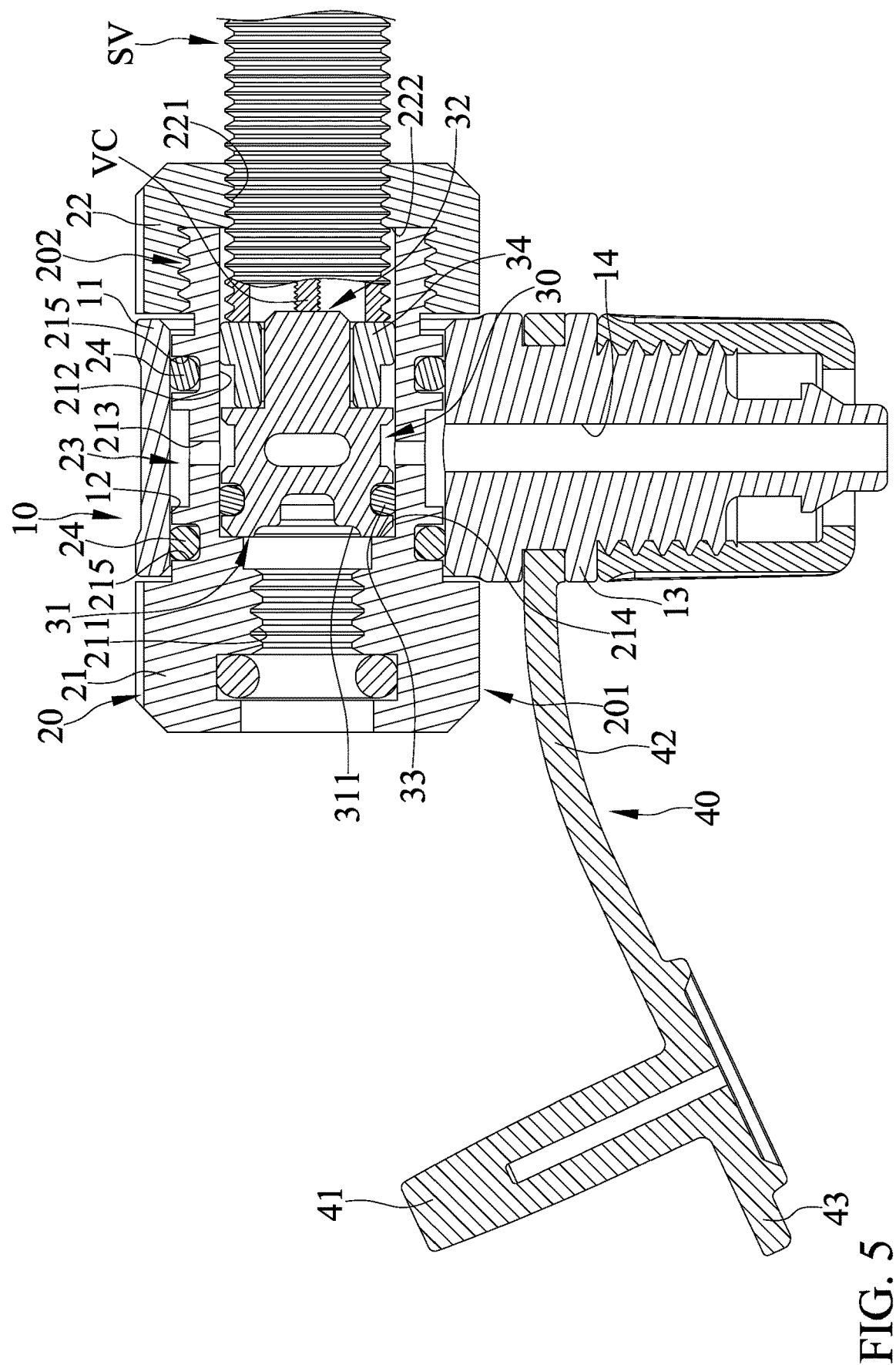
FIG. 5 is a cross sectional view of the inflator valve connector of FIG. 1 and shows the inflator valve connector connecting a Schrader valve.

The valve seat 30 is movably arranged in the receiving hole 212 and is pushed by the pushing member 40 or Schrader valve SV to close to the first connection hole 211 or the second connection hole 221. The valve seat 30 has a first abutting portion 31 disposed at a first end thereof and a second abutting portion 32 disposed at a second end thereof opposite to the first end. The first abutting portion 31 is faced to the first connection hole 211 and is adapted to abut a lock nut LN of the Presta valve PV (as shown in FIG. 4). The second abutting portion 32 is faced to the second connection hole 221 and is adapted to abut a valve core VC of the Schrader valve SV (as shown in FIG. 5). The first abutting portion 31 forms an abutting recess 311 adapted to abut the pushing portion 41 and the lock nut LN of the Presta valve PV. An airtight ring 33 is mounted around an outer periphery of the valve seat 30 and is abutted against an inner periphery of the receiving hole 212. An airtight sleeve 34 is mounted around the second abutting portion 32 and abuts the inner periphery of the receiving hole 212. The first abutting portion 31 and the airtight sleeve 34 respectively selectively abut the first shoulder 214 and the second shoulder 222 as the valve seat 30 moves relative to the receiving hole 212.

The pushing member 40 removably contacts the first connection member 21 of the connection assembly 20 and has a pushing portion 41, a connection portion 42 connected with the body 13, and a cover portion 43 disposed between the pushing portion 41 and the connection portion 42. In the embodiment, the pushing member 40 may be made of a flexible material, so that the pushing portion 41 is able to sway relative to the connection portion 42, and the connection portion 42 is ring-shaped to be sleeved on the body 13. The pushing portion 41 is adapted to enter the receiving hole 212 via the first connection hole 211 and to push against the first abutting portion 31, causing the valve seat 30 to move relative to the receiving hole 212 and to close to the second connection hole 221. Further, the pushing portion 41 is formed on an end face of the cover portion 43, and the cover portion 43 covers the first connection hole 211 when the pushing portion 41 enters the receiving hole 212 via the first connection hole 211.

Figure 3:
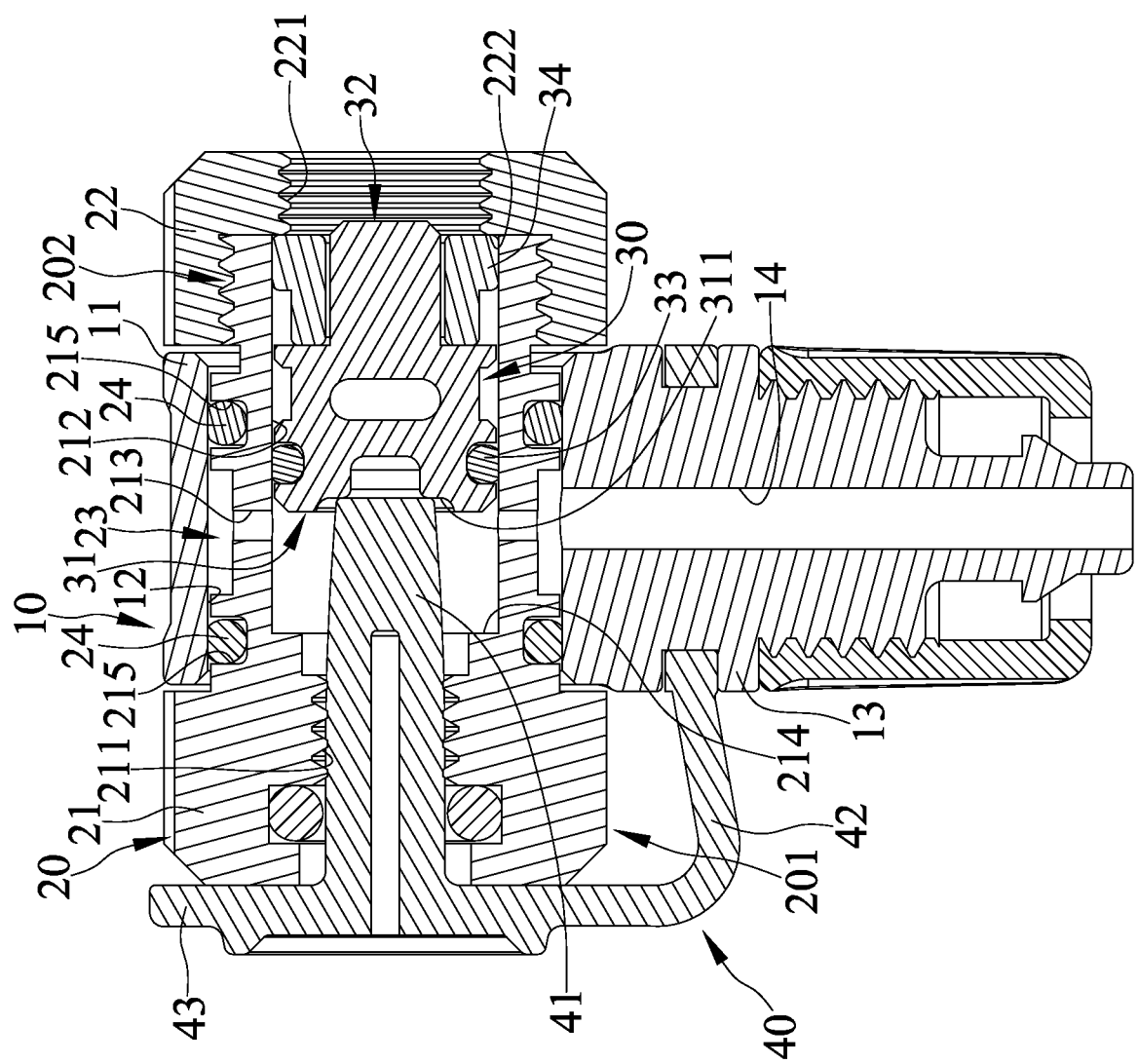
FIG. 3 is a cross sectional view of the inflator valve connector of FIG. 1.

FIG. 3 shows the inflator valve connector is in a static state. The cover portion 43 covers the first connection hole 211 of the first connection member 21. The pushing portion 41 enters the receiving hole 212 via the first connection hole 211 and pushes against the first abutting portion 31 of the valve seat 30, causing the valve seat 30 to close to the second connection hole 221. The airtight ring 33 is located between the air vent 213 and the second connection hole 221. The airtight sleeve 34 abuts the second shoulder 222.

FIG. 4 shows the inflator valve connector connects a Presta valve PV. The pushing portion 41 can be swayed relative to the connection portion 42 to cause the cover portion 43 detached from the first connection hole 211. The Presta valve PV can be inserted into the first connection hole 211 until the lock nut LN of the Presta valve PV abuts against the abutting recess 311 of the first abutting portion 31 to open the Presta valve PV. Thus, the high-pressure air provided by the inflator passes through the through hole 14, the air vent 213, the receiving hole 212 and the Presta valve PV to enter the object to be inflated.

FIG. 5 shows the inflator valve connector connects a Schrader valve SV. The cover portion 43 detached from the first connection hole 211, and the Schrader valve SV can be inserted into the second connection hole 221. The second abutting portion 32 is pushed by the valve core VC of the Schrader valve SV to cause the valve seat 30 moving relative to the receiving hole 212 and closing to the first connecting hole 211 and to open the Schrader valve SV. The airtight ring 33 passes over the air vent 213 and is located between the air vent 213 and the first connection hole 211. The first abutting portion 31 abuts the first shoulder 214. Thus, the high-pressure air provided by the inflator passes through the through hole 14, the air vent 213, the receiving hole 212 and the Schrader valve SV to enter the object to be inflated.

Although specific embodiments have been illustrated and described, numerous modifications and variations are still possible without departing from the scope of the invention. The scope of the invention is limited by the accompanying claims.

The invention claimed is:

1. An inflator valve connector comprising:
   a housing having a head, an axial hole arranged in the head, a body extended outwardly from the head, and a through hole arranged in the body and intercommunicated with the axial hole;
   a connection assembly rotatably arranged in the axial hole and including a first connection hole adapted to threadedly connect a Presta valve, a second connection hole adapted to threadedly connect a Schrader valve, and a receiving hole intercommunicated with the first and second connection holes, wherein the first and second connection holes are screw holes;
   a valve seat movably arranged in the receiving hole and having a first abutting portion disposed at a first end thereof and a second abutting portion disposed at a second end thereof opposite to the first end, wherein the first abutting portion is faced to the first connection hole and is adapted to abut a lock nut of the Presta valve, wherein the second abutting portion is faced to the second connection hole and is adapted to abut a valve core of the Schrader valve; and
   a pushing member removably contacting the connection assembly and having a pushing portion adapted to enter the receiving hole via the first connection hole and to push against the first abutting portion, causing the valve seat to move relative to the receiving hole and to close to the second connection hole, wherein the pushing member has a connection portion connected with the body, wherein the pushing member is made of a flexible material, so that the pushing portion is able to sway relative to the connection portion.

2. The inflator valve connector as claimed in claim 1, wherein the first abutting portion forms an abutting recess adapted to abut the pushing portion and the lock nut of the Presta valve.

3. The inflator valve connector as claimed in claim 1, wherein the connection portion is ring-shaped and is sleeved on the body.

4. The inflator valve connector as claimed in claim 1, wherein the pushing member has a cover portion disposed between the pushing portion and the connection portion, wherein the pushing portion is formed on an end face of the cover portion, and wherein the cover portion covers the first connection hole when the pushing portion enters the receiving hole via the first connection hole.

5. The inflator valve connector as claimed in claim 4, wherein the connection assembly includes a first connection member and a second connection member connected to the first connection member, wherein the first connection hole and the receiving hole are arranged in the first connection member, and wherein the second connection hole is arranged in the second connection member.

6. The inflator valve connector as claimed in claim 5, wherein the connection assembly includes an air passage formed between an inner periphery of the axial hole and an outer periphery of the first connection member, wherein the first connection member has an air vent penetrating therethrough and intercommunicated with the air passage and the through hole, wherein an airtight ring is mounted around an outer periphery of the valve seat and is abutted against an inner periphery of the receiving hole, wherein the airtight ring is located between the air vent and the second connection hole when the pushing portion pushes against the first abutting portion and the valve seat closes to the second connection hole, and wherein the airtight ring passes over the air vent and is located between the air vent and the first connection hole when the second connection hole connects the Schrader valve and the second abutting portion is pushed by the valve core of the Schrader valve to cause the valve seat moving relative to the receiving hole and closing to the first connecting hole.

7. The inflator valve connector as claimed in claim 6, wherein the first connection member has a first shoulder formed between the first connection hole and the receiving hole, wherein the second connection member has a second shoulder formed between the second connection hole and the receiving hole, wherein an airtight sleeve is mounted around the second abutting portion and abuts the inner periphery of the receiving hole, and wherein the first abutting portion and the airtight sleeve respectively selectively abut the first shoulder and the second shoulder as the valve seat moves relative to the receiving hole.

8. The inflator valve connector as claimed in claim 6, wherein the first connection member has two annular grooves respectively formed at two opposite sides of the air vent, and wherein the connection assembly includes two seal rings respectively arranged in the two annular grooves and abutted against the inner periphery of the axial hole.

9. The inflator valve connector as claimed in claim 6, wherein the first connection member has a large diameter section and a small diameter section connected to the large diameter section, wherein the large diameter section is exposed to the axial hole, wherein the small diameter section passes through the axial hole and is connected to the second connection member, wherein the first connection hole is formed in the large diameter section, wherein the receiving hole is formed in the small diameter section, and wherein the air passage is formed between the inner periphery of the axial hole and an outer periphery of the small diameter section.

10. An inflator valve connector comprising:
    a housing having a head, an axial hole arranged in the head, a body extended outwardly from the head, and a through hole arranged in the body and intercommunicated with the axial hole;
    a connection assembly rotatably arranged in the axial hole and including a first connection hole adapted to threadedly connect a Presta valve, a second connection hole adapted to threadedly connect a Schrader valve, and a receiving hole intercommunicated with the first and second connection holes, wherein the first and second connection holes are screw holes;
    a valve seat movably arranged in the receiving hole and having a first abutting portion disposed at a first end thereof and a second abutting portion disposed at a second end thereof opposite to the first end, wherein the first abutting portion is faced to the first connection hole and is adapted to abut a lock nut of the Presta valve, wherein the second abutting portion is faced to the second connection hole and is adapted to abut a valve core of the Schrader valve; and
    a pushing member removably contacting the connection assembly and having a pushing portion adapted to enter the receiving hole via the first connection hole and to push against the first abutting portion, causing the valve seat to move relative to the receiving hole and to close to the second connection hole, and wherein the pushing member further has a connection portion connected with the body and integrally formed with the pushing portion.

\* \* \* \* \*